United States Patent
Omaru

(10) Patent No.: US 8,027,132 B2
(45) Date of Patent: Sep. 27, 2011

(54) FAILURE DETECTION DEVICE FOR POWER CIRCUIT INCLUDING SWITCHING ELEMENT

(75) Inventor: Takeshi Omaru, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 792 days.

(21) Appl. No.: 12/127,506

(22) Filed: May 27, 2008

(65) Prior Publication Data

US 2009/0160476 A1    Jun. 25, 2009

(30) Foreign Application Priority Data

Dec. 25, 2007  (JP) ................. 2007-332372

(51) Int. Cl.
    *H02H 3/08* (2006.01)
(52) U.S. Cl. ............................................. 361/93.1
(58) Field of Classification Search ............. 361/93.1
    See application file for complete search history.

(56) References Cited

U.S. PATENT DOCUMENTS

| | | | |
|---|---|---|---|
| 4,346,347 A * | 8/1982 | Kamata et al. | 324/762.07 |
| 4,423,457 A * | 12/1983 | Brajder | 361/86 |
| 7,084,692 B2 * | 8/2006 | Peron | 327/322 |
| 7,482,765 B2 * | 1/2009 | Ito et al. | 315/312 |
| 2002/0039034 A1 * | 4/2002 | Kohda | 326/123 |
| 2004/0090260 A1 * | 5/2004 | Peron | 327/465 |
| 2005/0184705 A1 * | 8/2005 | Gawell et al. | 320/160 |
| 2008/0106319 A1 * | 5/2008 | Bayerer | 327/432 |
| 2009/0160476 A1 * | 6/2009 | Omaru | 324/765 |
| 2009/0268360 A1 * | 10/2009 | Shinomiya et al. | 361/56 |
| 2011/0127972 A1 * | 6/2011 | Busto Llavona et al. | 323/222 |

FOREIGN PATENT DOCUMENTS

| | | |
|---|---|---|
| JP | 4-185228 | 7/1992 |
| JP | 6-165480 | 6/1994 |
| JP | 11-18412 | 1/1999 |
| JP | 2001-197724 | 7/2001 |
| JP | 2007-252020 | 9/2007 |

* cited by examiner

Primary Examiner — Ronald W Leja
(74) Attorney, Agent, or Firm — Oblon, Spivak, McClelland, Maier & Neustadt, L.L.P.

(57) ABSTRACT

A failure detection device detects the voltage across the main electrodes of an IGBT via a diode. The failure detection device determines occurrence of short-circuit failure in the IGBT when the anode voltage of the diode is lower than a first predetermined reference voltage. Determination can be made, excluding the case of a proper operation corresponding to a flywheel diode in an ON state, preferably together with the condition that the anode voltage of the diode is higher than a second predetermined reference voltage.

9 Claims, 11 Drawing Sheets

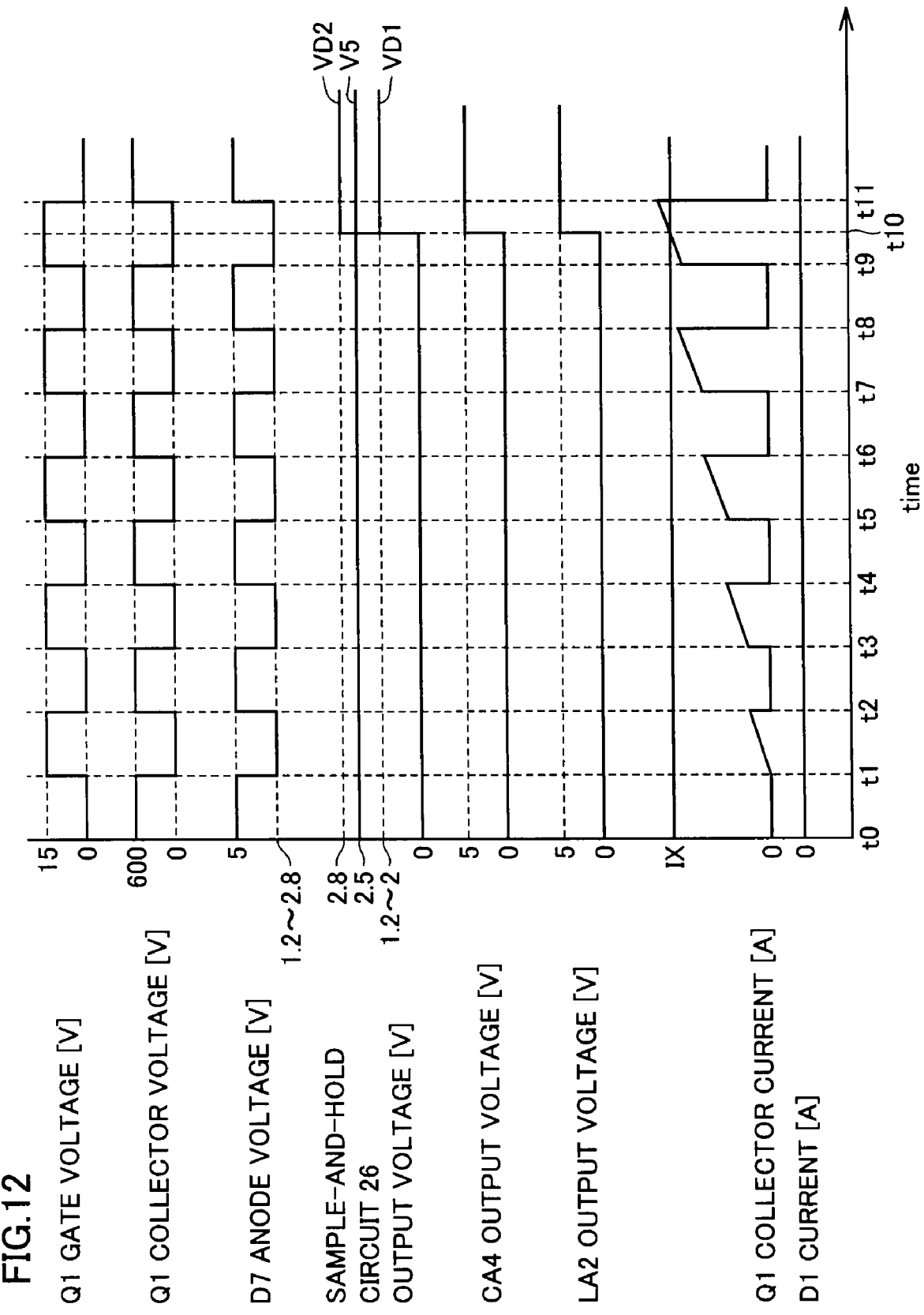

FAILURE DETECTION DEVICE FOR POWER CIRCUIT INCLUDING SWITCHING ELEMENT

BACKGROUND OF THE INVENTION

1. Field of the Invention

The present invention relates to a device that detects failure in a power semiconductor element employed in an inverter circuit and the like.

2. Description of the Background Art

There is known the art of sensing overcurrent at a power semiconductor element to obviate damage of the semiconductor element, as disclosed in Japanese Patent Laying-Open Nos. 04-185228 and 2001-197724.

The short-circuit protection device disclosed in Japanese Patent Laying-Open No. 04-185228 is configured having, parallel to a switching element constituting an inverter, a low voltage supply for short-circuit detection, a variable resistor, and a diode applying forward bias to the switching element by the low voltage supply only when the switching element is conductive, connected in series. As a result of a flow of high current to the switching element, the voltage output from the voltage output terminal of the variable resistor will exceed the threshold value. At this stage, the switching element is forced to be cut off, whereby damage at the switching element is obviated.

At a gate drive circuit of an IGBT (Insulated Gate Bipolar Transistor) disclosed in Japanese Patent Laying-Open No. 2001-197724, the voltage across the collector and emitter of the IGBT is detected via the resistor and diode. Determination is made that the IGBT attains an overcurrent state when the detected value exceeds the voltage of the reference power supply incorporated in the overcurrent determination circuit. In response, the cutoff circuit is operated to gradually turn OFF the IGBT.

In the case where the switching element for power such as the IGBT or MOSFET (Metal Oxide Semiconductor Field Effect Transistor) constituting the power module fails by some reason, the possibility of short-circuiting between the main electrodes of the switching element is high. In the event that the load coupled to the power module corresponds to inductive load such as a synchronous motor, the counter-electromotive force generated at the load by the short-circuit current across the main electrodes may cause overload at the power module.

In order to protect the entire system employing a power module, the breakdown voltage of the power switching element must be constantly monitored to cut off the current output from the power module to the load when the switching element breaks down.

SUMMARY OF THE INVENTION

An object of the present invention is to provide a failure detection device that can detect failure, based on a simple configuration, in a power switching element employed in a power module.

The present invention is directed to a failure detection device for a power circuit including a switching element having a main current flowing from a first main electrode to a second main electrode altered according to a control signal. The failure detection device includes a first rectifying element, a first resistance element, and a failure determination unit. The first rectifying element has its cathode connected to the first main electrode. The first resistance element has one end connected to an anode of the first rectifying element. A voltage positive to the second main electrode is applied to the other end of the first resistance element. The failure determination unit determines whether a failure determination condition to detect failure in the switching element is satisfied or not. The failure determination condition includes the condition that a monitor voltage between the anode of the first rectifying element and the second main electrode is lower than a first reference voltage that is determined in advance. The first reference voltage is set to a voltage lower than the sum of the voltage across the first and second main electrodes of the switching element in an ON state and the forward voltage of the first rectifying element, and higher than the forward voltage of the first rectifying element.

The main advantage of the present invention is to allow detection of failure in a switching element based on a simple configuration in which the voltage across the first and second main electrodes of a power switching element is monitored via the first rectifying element.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a timing chart schematically showing an example of voltage and current waveforms of each element in FIG. 9.

DESCRIPTION OF THE PREFERRED EMBODIMENTS

Figure 1:
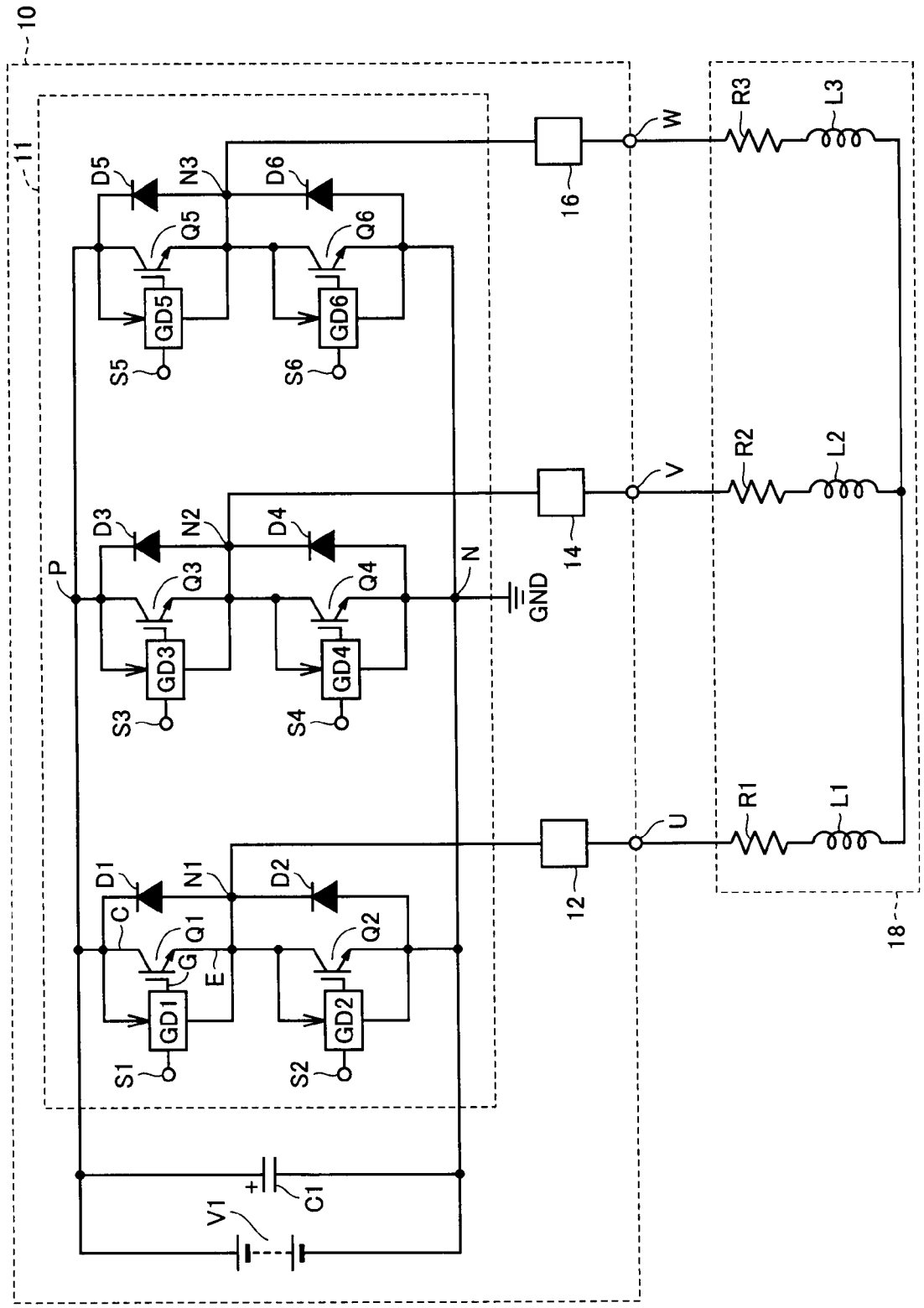
FIG. 1 is a circuit diagram to describe a configuration of a motor drive device 10 to which a failure detection device according to a first embodiment of the present invention is applied.

Embodiments of the present invention will be described in detail hereinafter with reference to the drawings. In the drawings, the same or corresponding elements have the same reference characters allotted, and description thereof will not be repeated.

Although each of the embodiments set forth below is based on an IGBT as an example of a power switching element, the present invention is also applicable to other switching elements such as an MOSFET or a bipolar transistor.

First Embodiment

The first embodiment is directed to a failure detection device 1A detecting short-circuit failure in an IGBT.

FIG. 1 is a diagram to describe a configuration of a motor drive device 10 to which the failure detection device of the first embodiment is applied.

Referring to FIG. 1, motor drive device 10 supplies three-phase AC (alternating current) power to a motor 18 from output nodes U, V, and W. Motor 18 is a three-phase AC motor, equivalently represented by resistances R1, R2, and R3 of the winding and inductors L1, L2 and L3 of the winding for each phase.

Motor drive device 10 includes a DC (direct current) power supply V1, a capacitor C1 connected parallel to DC power supply V1 for smoothing, an inverter circuit 11, and breakers 12, 14 and 16. An AC power supply and rectifying circuit can be employed instead of DC power supply V1.

Inverter circuit 111 is a three-phase bridge circuit, including two N channel IGBTs (IGBT Q1 and IGBT Q2 for the U phase, IGBT Q3 and IGBT Q4 for the V phase, and IGBT Q5 and IGBT Q6 for the W phase) connected in series between a high voltage node P and a low voltage node N (ground GND) for each phase. Inverter circuit 11 converts the output of DC power supply V1 to AC power by switching IGBT Q1-IGBT Q6 ON/OFF. The converted AC power is output from output nodes N1, N2 and N3 of each phase. Conversion from direct current to alternating current is based on, for example, pulse width modulation (PWM).

Inverter circuit 11 further includes flywheel diodes D1-D6 connected parallel to IGBT Q I-IGBT Q6, and gate drive circuits GD1-GD6 to apply a gate voltage across the gate and emitter of IGBT Q1-IGBT Q6.

Flywheel diodes D1-D6 are provided to cause the induced electromotive force generated at motor 18 to flow back when a corresponding one of IGBT Q1-IGBT Q6 is OFF. Flywheel diodes D1-D6 have their cathodes connected to a collector C identified as the first main electrode of IGBT Q1-IGBT Q6, respectively, and their anodes connected to an emitter E identified as the second main electrode of IGBT Q1-IGBT Q6, respectively.

Gate drive circuits GD1-GD6 respond to a control signal applied to input nodes S1-S6 to output a gate voltage of high level/low level across the gate and emitter of IGBT Q1-IGBT Q6. The control signal is supplied from a computer directed to control (reference number 20 in FIG. 2).

Breakers 12, 14 and 16 receive an output from a failure detection device that will be described afterwards to cut off the current of each phase supplied from inverter circuit 11 to motor 18 at the time of short-circuit failure in IGBT Q1-IGBT Q6.

Figure 2:
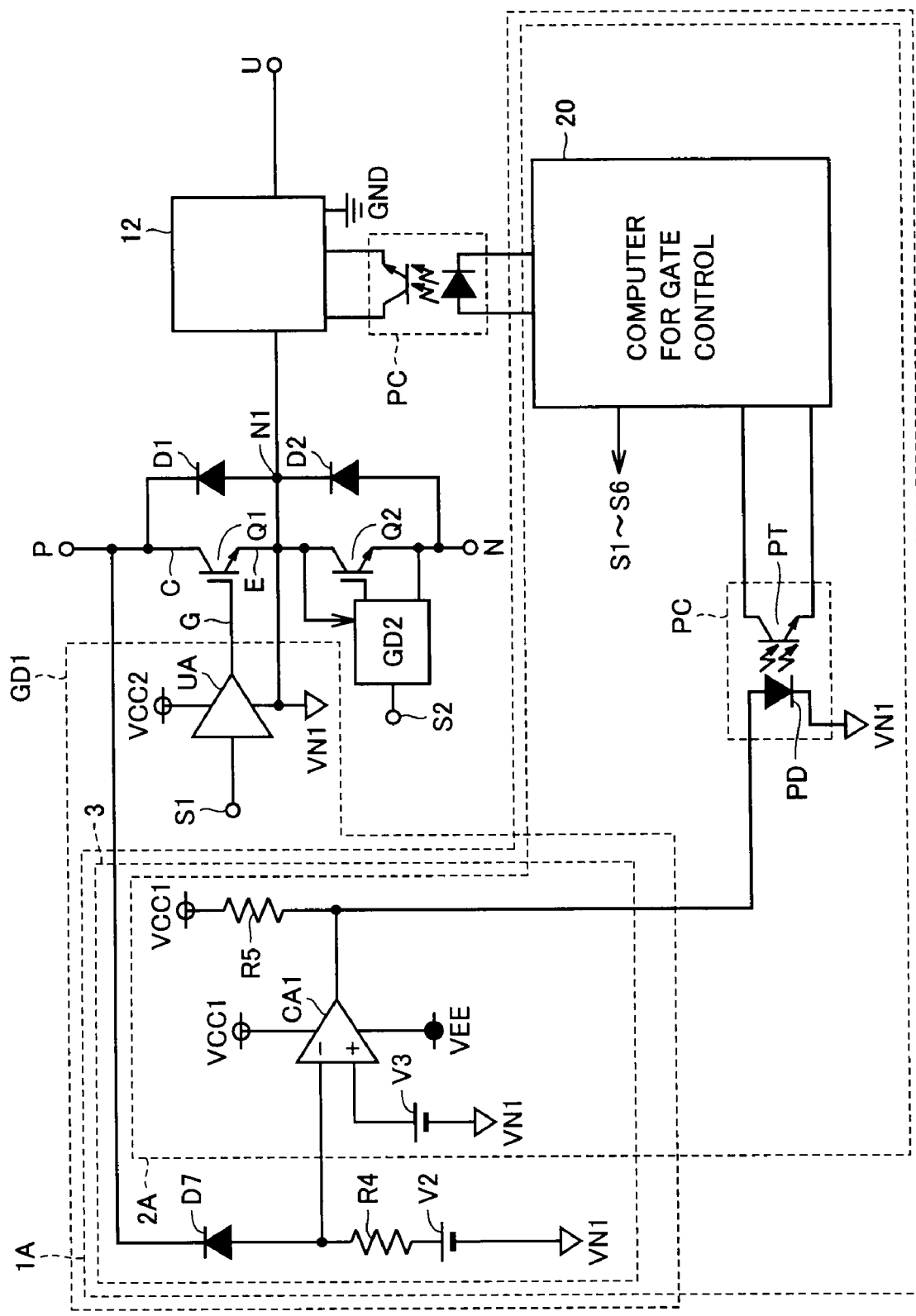
FIG. 2 is a diagram to describe a configuration of a failure detection device 1A employed for an IGBT Q1 of FIG. 1.
Figure 3:
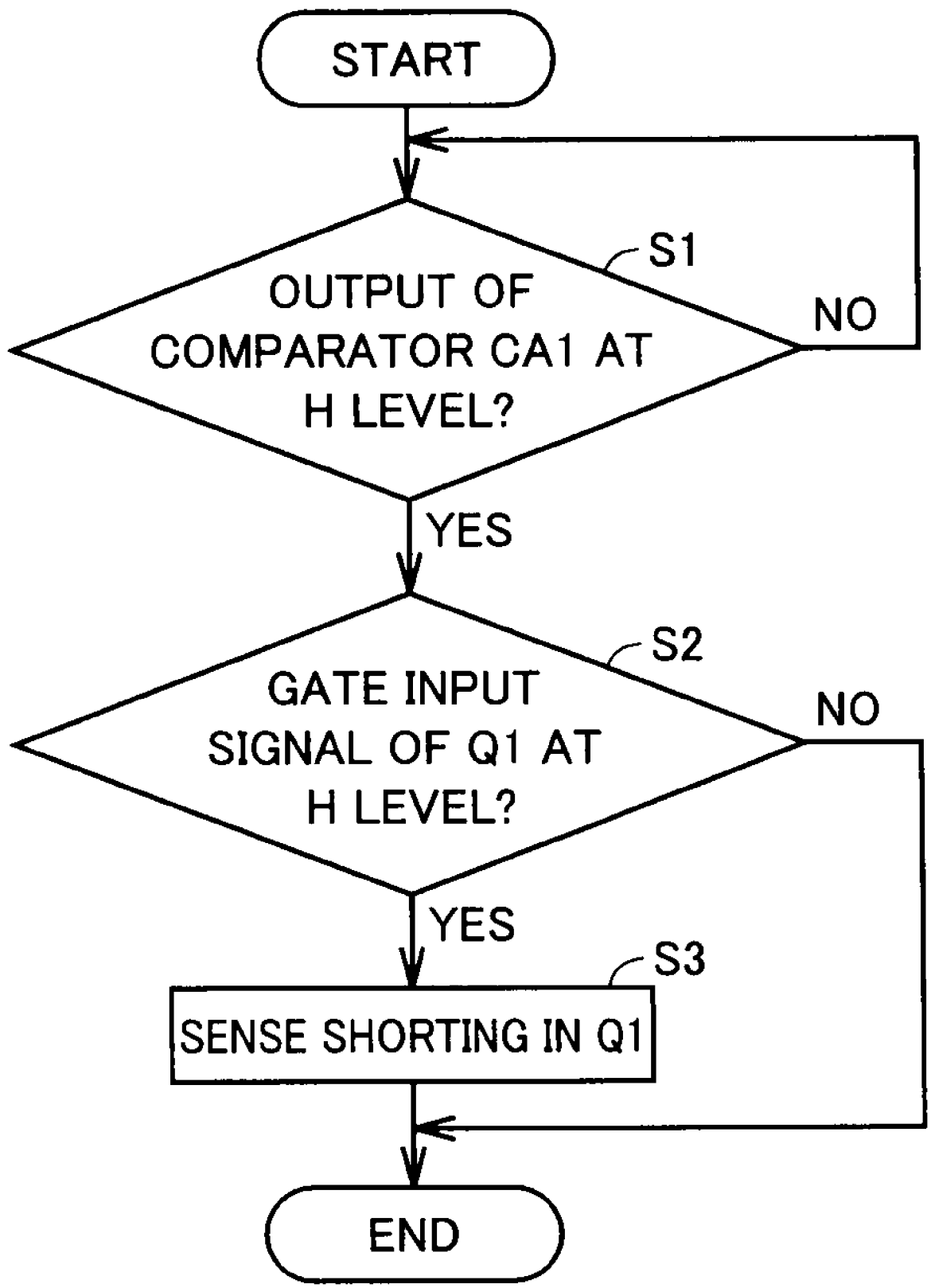
FIG. 3 is a flowchart of a failure detection process at a computer 20 for gate control of FIG. 2.
Figure 4:
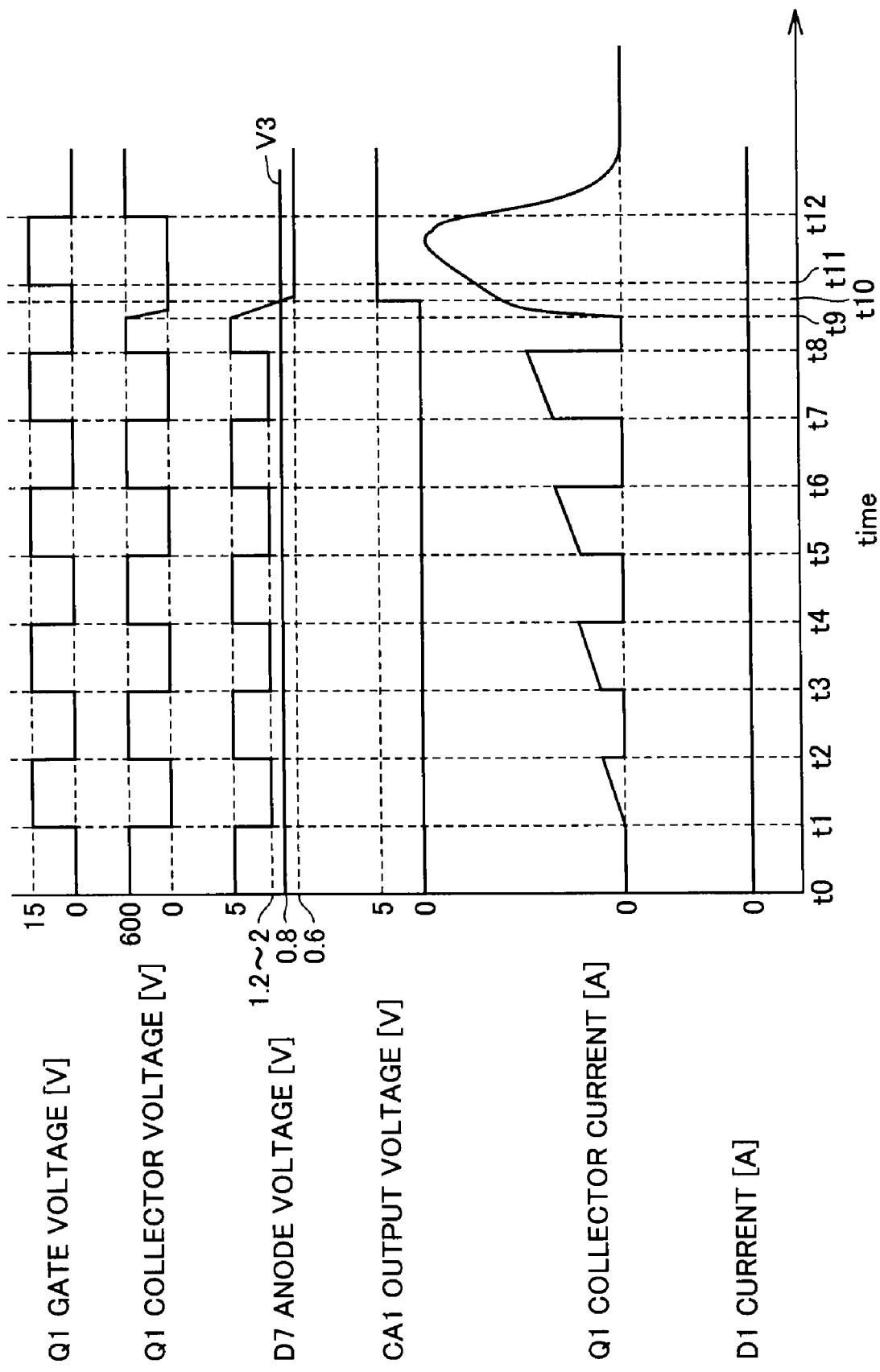
FIG. 4 is a timing chart schematically showing an example of voltage and current waveforms of each element in FIG. 2.

Referring to FIGS. 2-4, a failure detection device detecting short-circuit failure in IGBT Q1-IGBT Q6 employed in inverter circuit 11 set forth above will be described hereinafter. A failure detection circuit of the same configuration is provided for each of IGBT Q1-IGBT Q6. A failure detection device 1A provided for IGBT Q1 will be described representative thereof.

FIG. 2 is a circuit diagram of a configuration of failure detection device 1A employed in IGBT Q1 of FIG. 1. In the circuit diagram of FIG. 2, a common potential VN1 qualified as a reference to the potential corresponds to the potential of emitter E (node N1) of IGBT Q1.

Referring to FIG. 2, failure detection device 1A includes the aforementioned control computer 20, and a failure detection circuit 3 provided at gate drive circuit GD1. Failure detection circuit 3 includes a diode D7 with high breakdown voltage, resistance elements R4 and R5, DC power supplies V2 and V3, and a comparator CA1 with an open collector output. Gate drive circuit GD1 includes, in addition to failure detection circuit 3, a drive circuit UA amplifying a control signal from gate control computer 20 for output to a gate G of IGBT Q1. As shown in FIG. 2, comparator CA1 operates at a power supply voltage VCC1 (for example, 5 V), whereas drive circuit UA operates at a power supply voltage VCC2 (for example, 15 V).

In failure detection circuit 3 of FIG. 2, diode D7 has its cathode connected to collector C of IGBT Q1. Diode D7 has its anode connected to one end of resistance element R4 and an inverting input terminal of comparator CA1.

DC power supply V2 is connected between the other end of resistance element R4 and node N1. DC power supply V3 is connected between the non-inverting input terminal of comparator CA1 and node N1. DC power supply V3 provides the reference potential for comparison with the potential of the anode of diode D7.

The voltage of DC power supply V2 is set sufficiently lower than the voltage of several hundred volts applied between nodes P and N of inverter circuit 11. For example, the voltage of DC power supply V2 is set to 5 V. The voltage of DC power supply V3 is set lower than the sum of the collector-emitter voltage of IGBT Q1 in an ON state (hereinafter, also referred to as "ON voltage") and the forward voltage of diode D7, and higher than the forward voltage of diode D7. When the ON voltage of IGBT Q1 is 0.6 V, and the forward voltage of diode D7 is 0.6 V, for example, the voltage of DC power supply V3 is set to a value between 0.6 to 1.2 V, for example, to 0.8 V. In consideration of the input voltage being in the vicinity of 0 V, the potential of negative-side power supply node VEE connected to comparator CA1 is set lower than potential VN1 of node N1 corresponding to the reference.

Comparator CA1 has its output terminal connected to power supply node VCC1 via resistance element R5. The output of comparator CA1 attains an open state when the input voltage of the non-inverting input terminal is higher than the input voltage of the inverting output terminal. At this stage, the potential of the output terminal of comparator CA1 attains a high level pulled up through resistance element R5.

Gate control computer 20 receives an output signal of comparator CA1 via a photocoupler PC. Photocoupler PC is provided to electrically insulate failure detection circuit 3 from gate control computer 20. At photocoupler PC, a phototransistor PT receiving the light emission of photodiode PD is rendered conductive when the input signal is at a high level.

Gate control computer 20 outputs a signal to cut off breaker 12 based on the control signal applied to gate G of IGBT Q1 and the output of comparator CA1. Gate control computer 20 and breaker 12 are connected via photocoupler PC.

The operation of failure detection device 1A will be described hereinafter. From the functional aspect, comparator CA1, DC power supply V3, resistance element R5 and gate control computer 20 in failure detection device 1A constitute a failure determination unit 2A to determine failure in IGBT Q1. Failure determination unit 2A monitors the potential of the anode of diode D7 relative to the potential of node N1. Failure determination unit 2A determines short-circuit failure in IGBT Q1 based on the monitored anode potential of diode D7.

The operation mode of failure determination unit 2A will be described specifically, classified into the four operations of (i) to (iv) set forth below.

(i) When IGBT Q1 is properly ON in the event of high voltage (for example, several hundred volts) applied between nodes P and N in FIG. 2:

In this case, the sum of the ON voltage of IGBT Q1 and the forward voltage of diode D7 (for example, 1.2 V) constitute the voltage applied to the inverting input terminal of comparator CA1 connected to the anode of diode D7. As a result, the input voltage of the inverting input terminal of comparator CA1 becomes higher than the voltage of DC power supply V3 (for example, 0.8 V). Therefore, the output of comparator CA1 attains a low level (common potential VN1). In other words, failure determination unit 2A determines that short-circuit failure has not occurred.

(ii) When short-circuit failure occurs at IGBT Q1 or flywheel diode D1 regardless of whether voltage is applied between nodes P and N:

In this case, the potential of collector C of IGBT Q1 is substantially 0 V. Therefore, the forward voltage of diode D7 (for example, 0.6 V) is applied to the inverting input terminal of comparator CA1. As a result, the input voltage at the inverting input terminal of comparator CA1 becomes lower than the voltage (for example, 0.8 V) of DC power supply V3. Therefore, the output of comparator CA1 attains a high level (the potential pulled up through resistance element R5). In other words, failure determination unit 2A determines that short-circuit failure has occurred.

(iii) When IGBT Q1 is properly OFF and flywheel diode D1 is OFF in the event of high voltage (for example, several hundred volts) applied between nodes P and N:

In this case, the high voltage between nodes P and N is blocked by diode D7 with a high breakdown voltage. Therefore, the voltage of DC power supply V2 (for example, 5 V) is applied to the inverting input terminal of comparator CA1. As a result, the input voltage of the inverting input terminal becomes higher than the voltage (for example, 0.8 V) of DC power supply V3. Therefore, the output of comparator CA1 attains a low level (common potential VN1). In other words, failure determination unit 2A determines that short-circuit failure has not occurred.

(iv) When IGBT Q1 is properly OFF and flywheel diode D1 is ON in the event of high voltage (for example, several hundred volts) applied between nodes P and N:

In this case, the potential of collector C of IGBT Q1 attains a level negative to common potential VN1 by the forward voltage of flywheel diode D1. As a result, the input voltage at the inverting input terminal of comparator CA1 is equal to the level of the forward voltage of diode D7 minus the forward voltage of flywheel diode D1 (lower than 0 V). Accordingly, the input voltage of the inverting input terminal becomes lower than the voltage (for example, 0.8 V) of DC power supply V3. Therefore, the output of comparator CA1 attains a high level. In other words, the detected result of failure detection circuit 3 will indicate occurrence of short-circuit failure, likewise with operation mode (ii) set forth above.

In view of the foregoing, failure detection device 1A of the first embodiment has control computer 20 determine failure in consideration of the logic level of the control signal supplied to IGBT Q1 to avoid determination of short-circuit failure in the case of operation mode (iv) set forth above.

FIG. 3 is a flow chart of a failure detection process at gate control computer 20 of FIG. 2.

At step S1 of FIG. 3, computer 20 is in a waiting mode until the output of comparator CA1 attains a high level. When the output of comparator CA1 attains a high level (YES at step S1), control proceeds to step S2.

At step S2, computer 20 determines whether the control signal supplied to gate G of IGBT Q1 is at a high level or not. Since the aforementioned operation mode (iv) corresponds to the case where the control signal is at a low level and IGBT Q1 is OFF, the case of the control signal corresponding to a low level (NO at step S2) is excluded.

When YES at both steps S1 and S2, control proceeds to step S3. At step S3, computer 20 determines short-circuit failure in IGBT Q1. Then, computer 20 outputs a signal to cut off breaker 12, and the failure detection process ends.

In summary, failure determination unit 2A of the first embodiment determines whether the failure determination condition set forth below is satisfied or not in order to detect failure in IGBT Q1. The failure determination condition at this stage is that the monitor voltage between the anode of diode D7 and emitter E of IGBT Q1 is lower than power supply voltage V3, and the control signal that turns ON IGBT Q1 is applied to IGBT Q1.

The operation of failure detection device 1A will be described with reference to specific voltage and current waveforms.

FIG. 4 is timing chart schematically showing an example of voltage and current waveforms of each element in FIG. 2. In FIG. 4, the gate voltage of IGBT Q1, the collector voltage of IGBT Q1, the anode voltage of diode D7, the output voltage of comparator CA1, the collector current (main current) of IGBT Q1, and the current of flywheel diode D1 are represented in sequence along the vertical axis. Time is plotted along the horizontal axis in FIG. 4.

Referring to FIG. 4, at the zones of time t0-t1, t2-t3, t4-t5, t6-t7 and t8-t11 (hereinafter, referred to as the OFF zone), IGBT Q1 has a gate voltage of 0 V and is OFF. Since flywheel diode D1 is constantly OFF in the case of FIG. 4, the collector voltage at the OFF zone corresponds to a high voltage of 600 V when IGBT Q1 is in a proper state. This high voltage is blocked by diode D7. Therefore, the anode voltage of diode D7 is equal to 5 V, which is the voltage of DC power supply V2.

At the zones of time t1-t2, t3-t4, t5-t6, t7-t8 and t11-t12 (hereinafter, referred to as the ON zone), IGBT Q1 has a gate voltage of 15 V and is ON. When IGBT Q1 is in a proper state at the ON zone of FIG. 4, the collector voltage is equal to the ON voltage of IGBT Q1. Therefore, the anode voltage of diode D7 is at the level of approximately 1.2 to 2 V that is the sum of the ON voltage of IGBT Q1 and the forward voltage of diode D7. During the ON zone of FIG. 4, the collector current of IGBT Q1 gradually rises by PWM control. The collector current is approximately 10 to 300 amperes.

At time t9 in the OFF zone of time t8-t11, short-circuit failure occurs at IGBT Q1. As a result, the collector voltage of IGBT Q1 gradually drops to 0 V, and the anode voltage of diode D7 gradually drops down to the level of the forward voltage (0.6 V). At the same time, collector current (short-circuit current) is generated. This short-circuit current becomes as high as several thousand amperes.

When the anode voltage of diode D7 becomes lower than power supply voltage V3 (0.8 V) that is the reference voltage at time t10, the output voltage of comparator CA1 is switched from a low level (0 V) to a high level (5 V).

At time t11, gate control computer 20 outputs a control signal to switch IGBT QI from an OFF state to an ON state. At this point of time, gate control computer 20 detects a high level output voltage of comparator CA1, and outputs a signal to cut off breaker 12. Eventually, the collector current of IGBT Q1 is cut to attain the level of 0 ampere.

According to failure detection device 1A of the first embodiment, the voltage across the collector and emitter of IGBT Q1 is monitored via diode D7. The high voltage applied across the collector and emitter when IGBT Q1 is OFF is blocked by diode D7 having a high breakdown voltage. Therefore, the voltage across the collector and emitter of IGBT Q1 can be monitored based on a simple method employing comparator CA1.

Failure detection device 1A determines failure in IGBT Q1 based on the combination of the condition that the anode voltage of diode D7 is lower than the reference voltage (V3) and the condition that the logic level of the control signal at gate G is at a high level. Thus, determination of short-circuiting at IGBT Q1 is allowed, distinct from the proper state when the collector-emitter voltage of IGBT Q1 is at a low level due to an ON state of flywheel diode D1.

Second Embodiment

Figure 5:
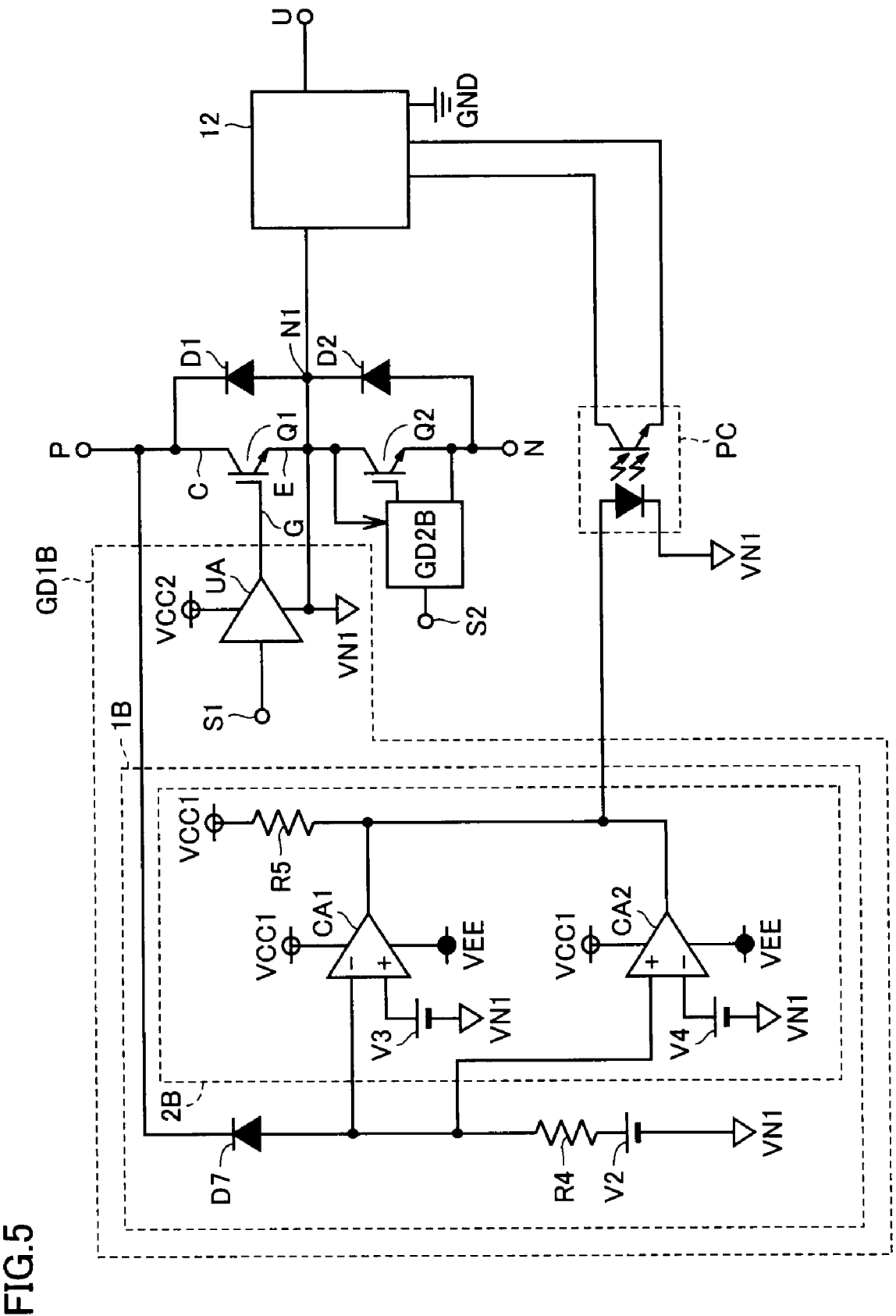
FIG. 5 is a circuit diagram of a configuration of a failure detection device 1B according to a second embodiment of the present invention.

FIG. 5 is a circuit diagram of a configuration of a failure detection device 1B according to a second embodiment of the present invention. Failure detection device 1B of FIG. 5 is a modification of failure detection device 1A of the first embodiment, and detects short-circuit failure in IGBT Q1. In the circuit diagram of FIG. 5, common potential VN1 qualified as the reference potential corresponds to the potential of emitter E (node N1) of IGBT Q1. A gate drive circuit and a failure detection device of the same configuration are provided for each of IGBT Q1-IGBT Q6. Therefore, a gate drive circuit GD1B and a failure detection device 1B provided for IGBT Q1 will be described representative thereof.

Referring to FIG. 5, gate drive circuit GDB1 includes a failure detection device 1B and a drive circuit UA. Failure detection device 1B includes a diode D7 with high breakdown voltage, a resistance element R4, a DC power supply V2, and a failure determination unit 2B. Failure determination unit 2B includes comparators CA1 and CA2 with an open collector output, DC power supplies V3 and V4, and a resistance element R5. Drive circuit UA is similar to that of the first embodiment, and operates at power supply voltage VCC2 (for example, 15 V).

In failure detection device 1B of FIG. 5, diode D7 has its cathode connected to collector C of IGBT Q1, and its anode connected to one end of resistance element R4, the inverting input terminal of comparator CA1, and the non-inverting input terminal of comparator CA2.

DC power supply V2 is connected between the other end of resistance element R4 and node N1. DC power supply V3 is connected between the non-inverting input terminal of comparator CA1 and node N1. DC power supply V4 is connected between the inverting input terminal of comparator CA2 and node N1. DC power supplies V3 and V4 provide the reference potential for comparison with the potential of the anode of diode D7.

The voltage of DC power supply V2 is set sufficiently lower than the several hundred volt voltage applied between nodes P and N of inverter circuit 11. For example, the voltage of DC power supply V2 is set to 5 V. The voltage of DC power supply V3 is set lower than the sum of the ON voltage of IGBT Q1 and the forward voltage of diode D7, and higher than the forward voltage of diode D7. For example, when the ON voltage of IGBT Q1 is 0.6 V and the forward voltage of diode D7 is 0.6 V, the voltage of DC power supply V3 is set to a value between 0.6 to 1.2 V, for example to 0.8 V. The voltage of DC power supply V4 is set higher than the value of the forward voltage of diode D7 minus the forward voltage of flywheel diode D1, and lower than the forward voltage of diode D7. For example, the inverting input terminal of comparator CA2 is connected to node N1 to set the voltage of the inverting input terminal to 0 V, instead of using DC power supply V4. In consideration of the input voltage being in the vicinity of 0 V, the potential of negative-side power supply node VEE connected to comparators CA1 and CA2 is set lower than potential VN1 of node N1 corresponding to the reference. Power supply voltage VCC1 at the positive side supplied to comparators CA1 and CA2 is set to, for example, 5 V.

The output terminals of comparators CA1 and CA2 are connected to power supply node VCC1 via resistance element R5. Comparators CA1 and CA2 constitute a window comparator. Therefore, when the anode voltage of diode D7 is higher than the voltage of DC power supply V4 and lower than the voltage of DC power supply V3, the voltage at the output terminals of comparators CA1 and CA2 attain a high level pulled up via resistance element R5.

The output terminals of comparators CA1 and CA2 are also connected to breaker 12 via photocoupler PC. Breaker 12 is cut off when the potential at the output terminals of comparators CA1 and CA2 are at a high level.

The operation of failure detection device 1B will be described hereinafter. Failure detection device 1B differs from failure detection device 1A of FIG. 2 in the further inclusion of comparator CA2 and DC power supply V4. Accordingly, failure in IGBT Q1 can be determined in the case where flywheel diode D1 is ON even without using gate control computer 20.

The operation mode of failure determination unit 2B will be specifically described hereinafter, classified into the four operation modes of (i)-(iv).

(i) When IGBT Q1 is properly ON in the event of high voltage (for example, several hundred volts) applied between nodes P and N in FIG. 5.

In this case, the anode voltage of diode D7 is equal to the sum of the ON voltage of IGBT Q1 and the forward voltage of diode D7 (for example, 1.2 V). Since the voltage at the inverting input terminal of comparator CA1 becomes higher than the voltage (for example, 0.8 V) of DC power supply V3, the output of comparator CA1 attains a low level (common potential VN1). The voltage at the non-inverting input terminal of comparator CA2 becomes higher than the voltage (for example, 0 V) of power supply voltage V4, the output of comparator CA2 attains an open state. Therefore, the output voltage of comparators CA1 and CA2 based on wired AND attains a low level. In other words, failure determination unit 2A determines that short-circuit failure has not occurred.

(ii) When short-circuit failure occurs at IGBT Q1 or flywheel diode D1 regardless of whether voltage is applied between nodes P and N:

In this case, the potential of collector C of IGBT Q1 is approximately 0 V. Therefore, the anode voltage of diode D7 is equal to the forward voltage (for example 0.6 V) of diode D7. Since the voltage at the inverting input terminal of comparator CA1 becomes lower than the voltage (for example, 0.8 V) of DC power supply V3, the output of comparator CA1 attains an open state. Furthermore, since the voltage at the non-inverting input terminal of comparator CA2 becomes higher than the voltage (for example, 0 V) of DC power supply V4, the output of comparator CA2 also attains an open state. As a result, the voltage at the output terminals of comparators CA1 and CA2 based on the wired AND attains a high level (voltage pulled up through resistance element R5). In other words, failure determination unit 2A determines occurrence of short-circuit failure.

(iii) When IGBT Q1 is properly OFF and flywheel diode D1 is OFF in the event of high voltage (for example, several hundred volts) applied between nodes P and N:

In this case, the high voltage between nodes P and N is blocked by diode D7 with a high breakdown voltage. Therefore, the anode voltage of diode D7 is equal to the voltage (for example, 5 V) of DC power supply V2. Since the voltage at the inverting input terminal comparator CA1 becomes higher than the voltage (for example 0.8 V) of DC power supply V3, the output of comparator CA1 attains a low level (common potential VN1). The voltage at the non-inverting input terminal of comparator CA2 becomes higher than the voltage (for example, 0 V) of power supply voltage V4, the output of comparator CA2 attains an open state. As a result, the output voltage of comparators CA1 and CA2 based on wired AND attains a low level. In other words, failure determination unit 2A determines that short-circuit failure has not occurred.

(iv) When IGBT Q1 is properly OFF and flywheel diode D1 is ON in the event of high voltage (for example, several hundred volts) applied between nodes P and N:

In this case, the potential of collector C of IGBT Q1 attains a level negative to common potential VN1 by an amount equal to the forward voltage of flywheel diode D1. As a result, the anode voltage of diode D7 is at the level of the forward voltage of diode D7 minus the forward voltage of flywheel diode D1 (less than 0 V). Therefore, since the input voltage of the inverting input terminal of comparator CA1 becomes lower than the voltage (for example, 0.8 V) of DC power supply V3, the output of comparator CA1 attains an open state. The voltage at the non-inverting input terminal of comparator CA2 becomes lower than the voltage (for example, 0 V) of DC power supply V4. Therefore, a low level output is provided (common potential VN1). As a result, the output voltage of comparators CA1 and CA2 based on wired AND attains a low level. In other words, failure determination unit 2A determines that short-circuit failure has not occurred.

In summary, failure determination unit 2B of the second embodiment determines that the monitor voltage between the anode of diode D7 and emitter E of IGBT Q1 is lower than the voltage of DC power supply V3 (hereinafter, also referred to as reference voltage V3) and higher than the voltage of DC power supply V4 (hereinafter, also referred to as reference voltage V4). As a result, detection is made that short-circuit failure has occurred at least one of IGBT Q1 and flywheel diode D1.

Figure 6:
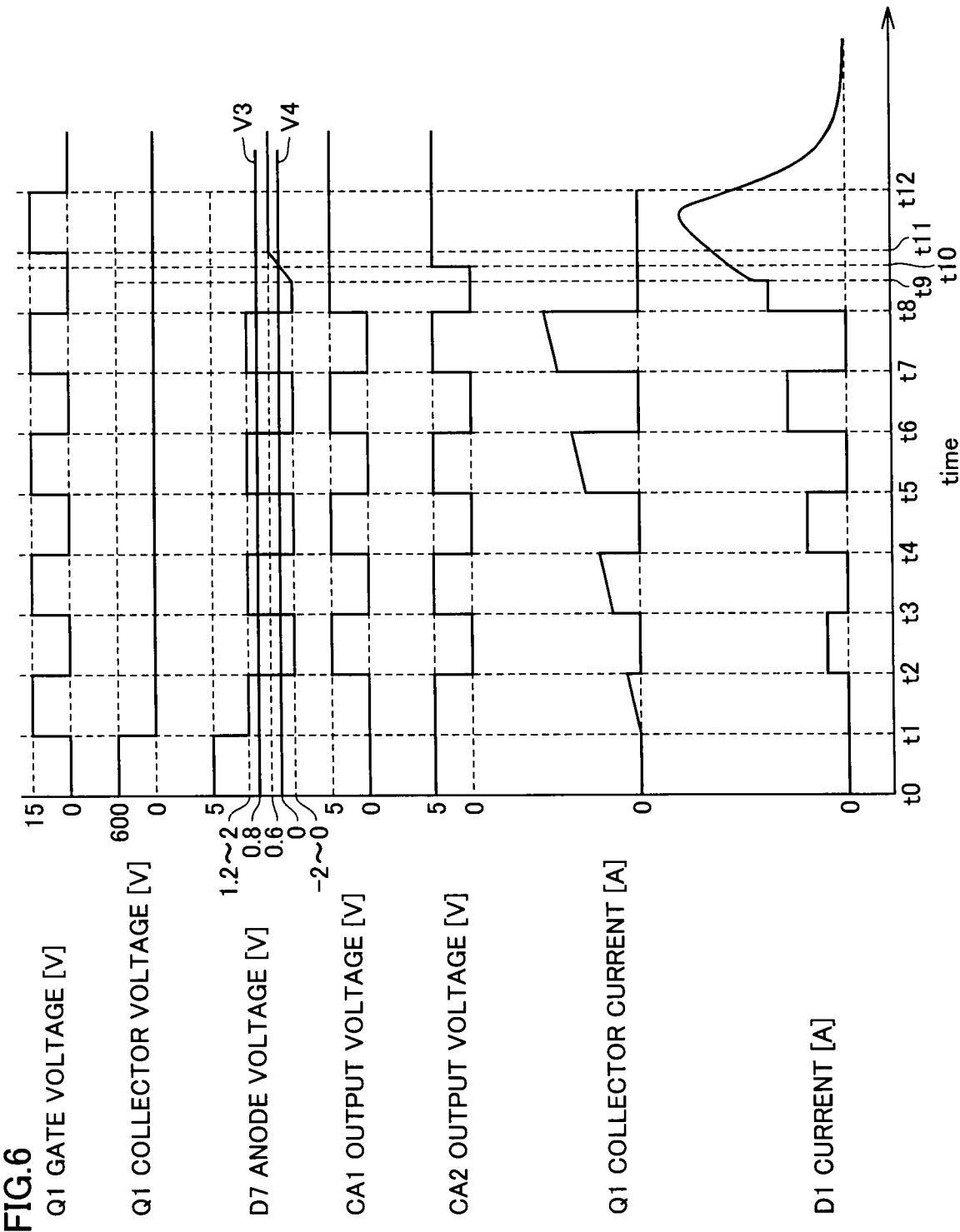
FIG. 6 is a timing chart schematically showing an example of voltage and current waveforms of each element in FIG. 5.

FIG. 6 is a timing chart schematically showing an example of the voltage and current waveforms of each element of FIG. 5. In FIG. 6, the gate voltage of IGBT Q1, the collector voltage of IGBT Q1, the anode voltage of diode D7, the output voltage of comparator CA1, the output voltage of comparator CA2, the collector current of IGBT Q1, and the current of flywheel diode D1 are represented in sequence along the vertical axis. The outputs of comparators CA1 and CA2, corresponding to the AND operation by wired AND in practice, are indicated individually for the sake of description in FIG. 6. Time is plotted along the horizontal axis in FIG. 6.

At the zones of time t0-t1, t2-t3, t4-t5, t6-t7 and t8-t11 (the OFF zone) in FIG. 6, IGBT Q1 has a gate voltage of 0 V and is OFF. At the zones of time t1-t2, t3-t4, t5-t6, t7-t8 and t11-t12 (the ON zone), IGBT Q1 has a gate voltage of 15 V and is ON.

At the ON zones of time t1-t2, t3-t4, t5-t6 and t7-t8 in FIG. 6, the collector current of IGBT Q1 gradually rises by PWM control. The collector current of IGBT Q1 is approximately 10 to 300 amperes. At this stage, since the collector voltage of IGBT Q1 is equal to the ON voltage, the anode voltage of diode D7 is at the level of approximately 1.2 to 2 V.

During the OFF zone of time t0-t1 in FIG. 6, flywheel diode D1 is OFF. At this stage, the high 600 V applied across the collector and emitter of IGBT Q1 is blocked by diode D7. Therefore, the anode voltage of diode D7 is equal to the voltage value of DC power supply V2, which is 5 V.

During the OFF zones of time t2-t3, t4-t5, t6-t7 and t8-t11, current flows to flywheel diode D7 by the induced electromotive force generated at the load. At this stage, the potential of collector C of IGBT Q1 is lower than the potential of emitter E by the forward voltage of flywheel diode D1. As a result, the anode voltage of diode D7 is at the level of approximately −2 to 0 V.

Thus, during the zone of time t0-t8, the anode voltage of diode D7 does not take a value between reference voltage V4 (0 V) and reference voltage V3 (0.6 V).

At time t9 in the OFF zone of time t8-t11, short-circuit failure occurs at flywheel diode D1. As a result, short-circuit current flows to flywheel diode D1. The collector voltage of IGBT Q1 that was a negative voltage at time t8-t9 is altered to 0 V by the short-circuit failure in flywheel diode D1. As a result, the anode voltage of diode D7 changes from the range of −2 V to 0 V to eventually 0.6 V, which is the forward voltage of diode D7.

At time t10, the anode voltage of diode D7 becomes higher than reference voltage V4 (0 V), and the output of comparator CA2 is switched from a low level (0 V) to a high level (5 V). As a result, the outputs of comparators CA1 and CA2 both attain a high level, and short-circuit failure is detected.

According to failure detection device 1B of the second embodiment, the voltage across the collector and emitter of IGBT Q1 is monitored via diode D7, likewise with the first embodiment. As a result, determination of short-circuit failure in IGBT Q1 can be made with a simple configuration employing comparators CA1 and CA2.

Failure detection device 1B determines failure in IGBT Q1 based on the determination condition that the anode voltage of diode D7 is higher than reference voltage V4 and lower than reference voltage V3. Therefore, determination of failure in IGBT Q1 can be made, distinct from the proper case of flywheel diode D1 at an ON state. Since failure determination is made using comparators CA1 and CA2, failure determination can be achieved faster than in the case of the first embodiment employing control computer 20.

Third Embodiment

Figure 7:
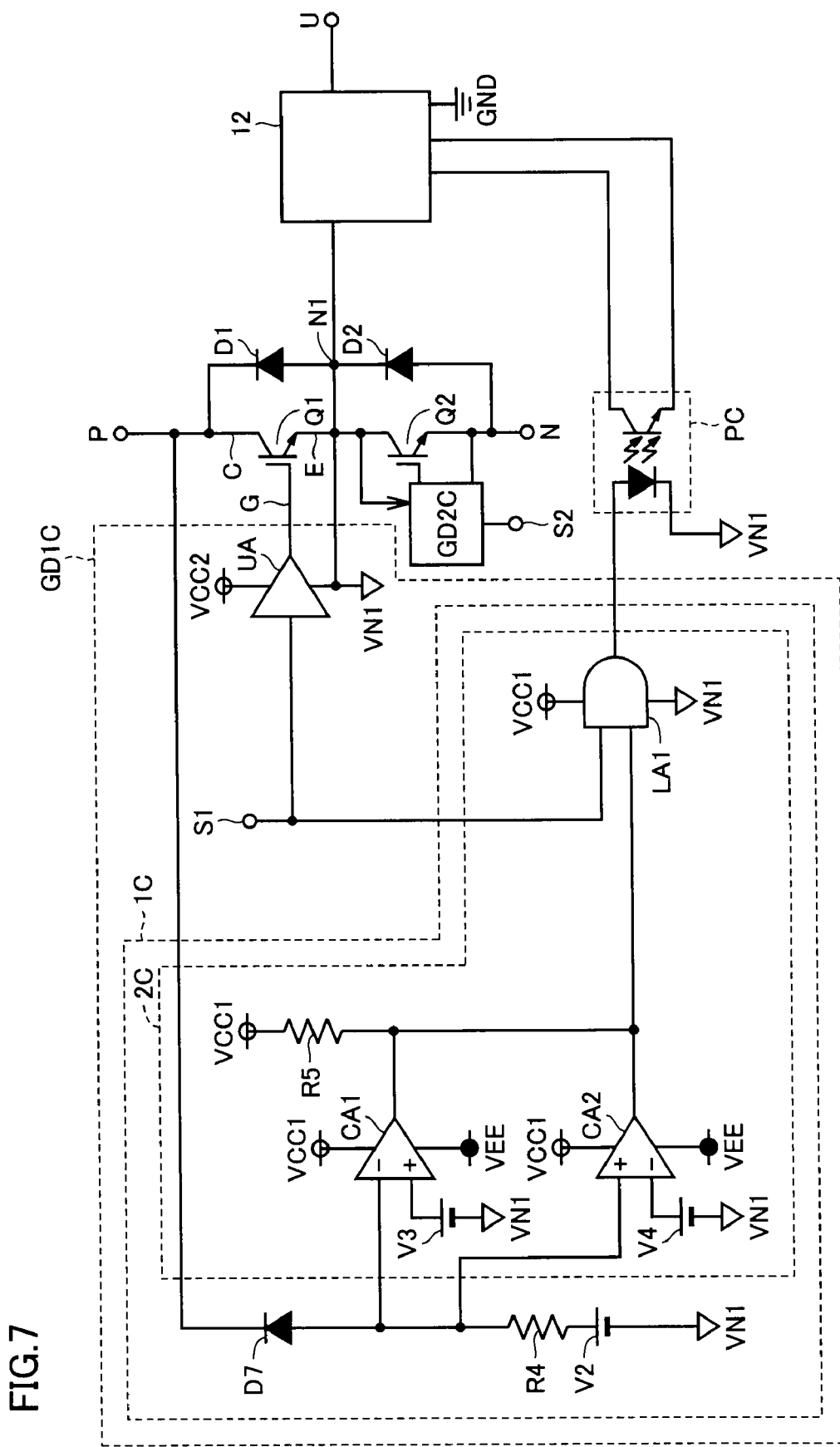
FIG. 7 is a circuit diagram of a configuration of a failure detection device 1C according to a third embodiment of the present invention.

FIG. 7 is a circuit diagram of a configuration of a failure detection device 1C according to a third embodiment of the present invention. Failure detection device 1C of FIG. 7 is a modification of failure detection device 1B of the second embodiment, and detects the occurrence of short-circuit failure in IGBT Q1. A gate drive circuit and a failure detection device of the same configuration are provided for each of IGBT Q1-IGBT Q6. Therefore, a gate drive circuit GD1C and a failure detection device 1C provided for IGBT Q I will be described representative thereof.

Referring to FIG. 7, gate drive circuit GD1C includes a failure detection device 1C and a drive circuit UA. Failure detection device 1C of FIG. 7 differs from failure detection device 1B of FIG. 5 in the further inclusion of a logic circuit LA1. The remaining elements of failure detection device 1C of FIG. 7 are common to those of failure detection device 1B of FIG. 5. Therefore, description of common elements will not be repeated. Drive circuit UA is similar to those in the first and second embodiments, operating at power supply voltage VCC2 (for example, 15 V).

Referring to FIG. 7, logic circuit LA1 is an AND circuit providing the AND operation of two input signals. Logic circuit LA1 has one input terminal connected to the output terminals of comparators CA1 and CA2, and the other input terminal connected to an input node S1 of the control signal of IGBT Q1. The output terminal of logic circuit LA1 is connected to photocoupler PC. Therefore, logic circuit LA1 outputs a signal of a high level when the output signals of comparators CA1 and CA2 are at a high level and the control signal of IGBT Q1 is at a high level. At this stage, failure determination unit 2C determines occurrence of short-circuit failure in IGBT Q1. Then, failure determination unit 2C cuts off breaker 12 connected via photocoupler PC. Logic circuit LA1 operates at power supply voltage VCC1 (for example, 5 V).

The ON voltage of IGBT Q1 varies depending on the collector current as well as the temperature. Therefore, the setting of the value of DC power supply V3 that is the threshold value for determination of short-circuit failure is difficult. Failure detection device 1C of FIG. 7 takes the AND of the outputs of comparators CA1 and CA2 and the control signal of IGBT Q1 to allow detection of short-circuit failure in IGBT Q1 at higher accuracy.

Figure 8:
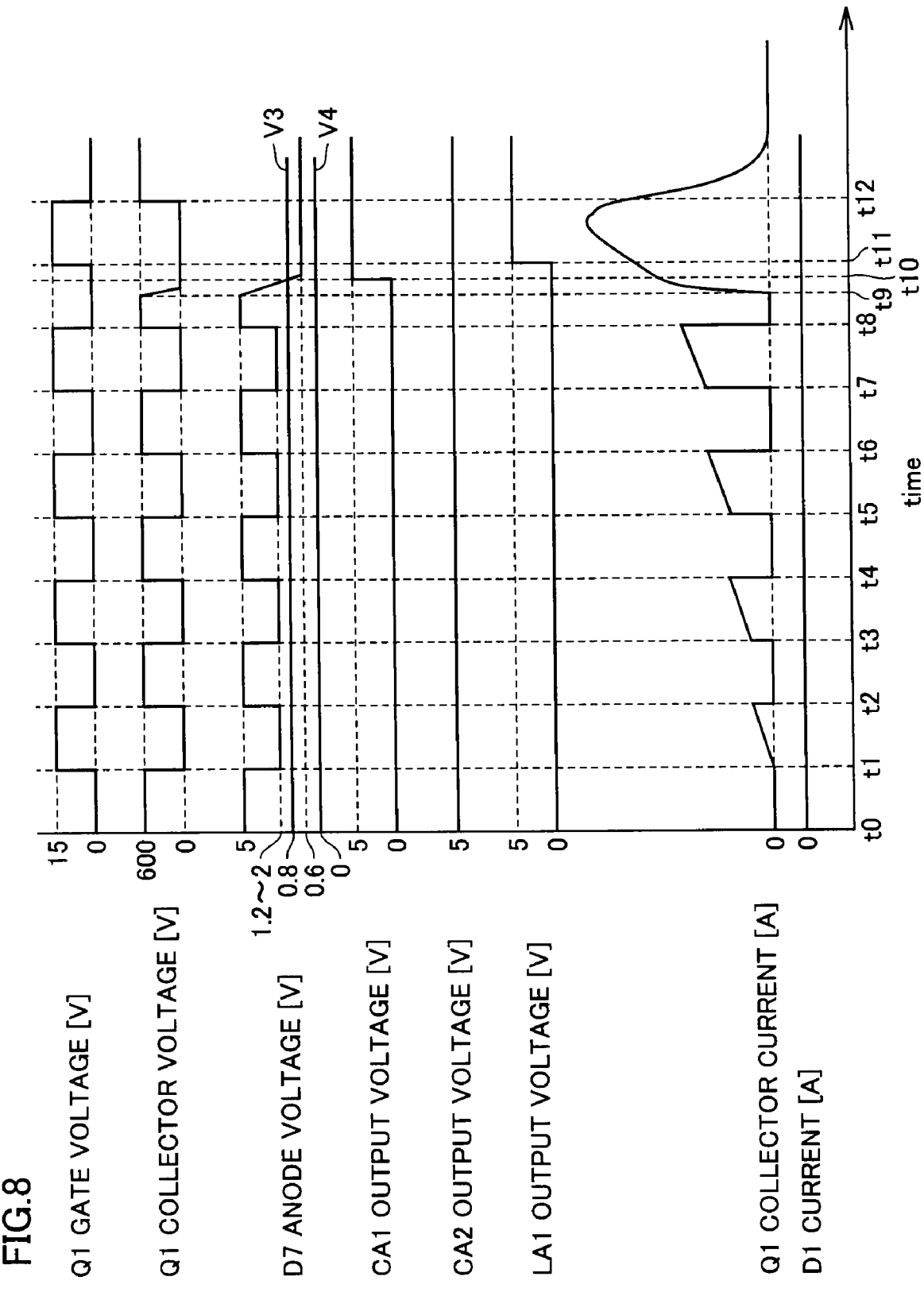
FIG. 8 is a timing chart schematically showing an example of voltage and current waveforms of each element in FIG. 7.

FIG. 8 is a timing chart schematically showing an example of voltage and current waveforms of each element in FIG. 7. In FIG. 8, the gate voltage of IGBT Q1, the collector voltage of IGBT Q1, the anode voltage of diode D7, the output voltage of comparator CA1, the output voltage of comparator CA2, the output voltage of logic circuit LA1, the collector current of IGBT Q1, and the current of flywheel diode D1 are represented in sequence along the vertical axis. The outputs of comparators CA1 and CA2, corresponding to the AND operation by wired AND in practice, are indicated individually for the sake of description in FIG. 8. Time is plotted along the horizontal axis in FIG. 8.

At the zones of time t0-t1, t2-t3, t4-t5, t6-t7 and t8-t11 (the OFF zone) in FIG. 8, IGBT Q1 has a gate voltage of 0 V and is OFF. Since flywheel diode D1 is constantly OFF in the case of FIG. 8, the collector voltage in the OFF zone corresponds to the high voltage of 600 V when IGBT Q1 is in a proper state. Since this high voltage is blocked by diode D7, the anode voltage of diode D7 is equal to 5 V, which is the voltage of DC power supply V2.

At the zones of time t1-t2, t3-t4, t5-t6, t7-t8 and t11-t12 (the ON zone), IGBT Q1 has a gate voltage of 15 V and is ON. When IGBT Q1 is in a proper state at the ON zone in FIG. 8, the collector voltage is equal to the ON voltage of IGBT Q1. Therefore, the anode voltage of diode D7 is approximately 1.2 V to 2 V, that is the sum of the ON voltage of IGBT Q1 and the forward voltage of diode D7. During the ON zone in FIG. 8, the collector current of IGBT Q1 gradually rises by PWM control. The level of the collector current is approximately 10 to 300 amperes.

In view of the foregoing, it is appreciated that the anode voltage of diode D7 does not take a value between reference voltage V4 (0 V) and reference voltage V3 (0.6 V) at time t0-t8. Therefore, the output of comparator CA1 is at a low level (0 V) and the output of comparator CA2 is at a high level (5 V) at time t0-t8.

Short-circuit failure occurs at IGBT Q1 at time t9 during the OFF zone of time t8-t11. As a result, the collector voltage of IGBT Q1 gradually drops to 0 V, and the anode voltage of diode D7 gradually drops down to the level of the forward voltage (0.6 V). At the same time, collector current (short-circuit current) is generated. The short-circuit current becomes as high as several thousand amperes.

When the anode voltage of diode D7 becomes lower than power supply voltage V3 (0.8 V) that is the reference voltage at time t10, the output voltage of comparator CA1 is switched from a low level (0 V) to a high level (5 V). As a result, the AND operation of the output of comparator CA1 and the output of comparator CA2 attains a high level.

At time t11, gate control computer 20 outputs a control signal of a high level to switch IGBT Q1 from an OFF state to an ON state, and the gate voltage of IGBT Q1 attains the level of 15 V. As a result, logic circuit LA1 is switched to a high level at time t11. Since breaker 12 receiving the high level output of logic circuit LA1 cuts the current flow to the load, the collector current of IGBT Q1 eventually becomes 0 ampere.

According to failure detection device 1C of the third embodiment, the outputs of comparators CA1 and CA2 and the control signal of IGBT Q1 are ANDed by means of logic circuit LA1. Therefore, detection of short-circuit failure in IGBT Q1 can be made at higher accuracy, in addition to the advantage of the second embodiment. Furthermore, since logical operation through logic circuit LA1 is effected without using gate control computer 20, differing from the first embodiment, failure detection faster than in the first embodiment can be achieved.

Fourth Embodiment

The fourth embodiment is directed to a failure detection device detecting degradation in the lifetime of a power switching element.

In general, a switching element employed in a power module is often joined by solder. Since the solder joint is degraded over time of usage of the power module, the ON voltage of the switching element will increase with respect to the same applied current over time. The metal wire used for electrically connecting the switching element is also degraded over time of usage to cause increase in the ON voltage with respect to the same applied current. A failure detection device 1D of the fourth embodiment determines degradation in the lifetime of the power switching element by detecting increase in the ON voltage with respect to the same applied current. Failure detection device 1D may be used solely, or together with failure detection devices 1A, 1B and 1C of the first to third embodiments.

Figure 9:
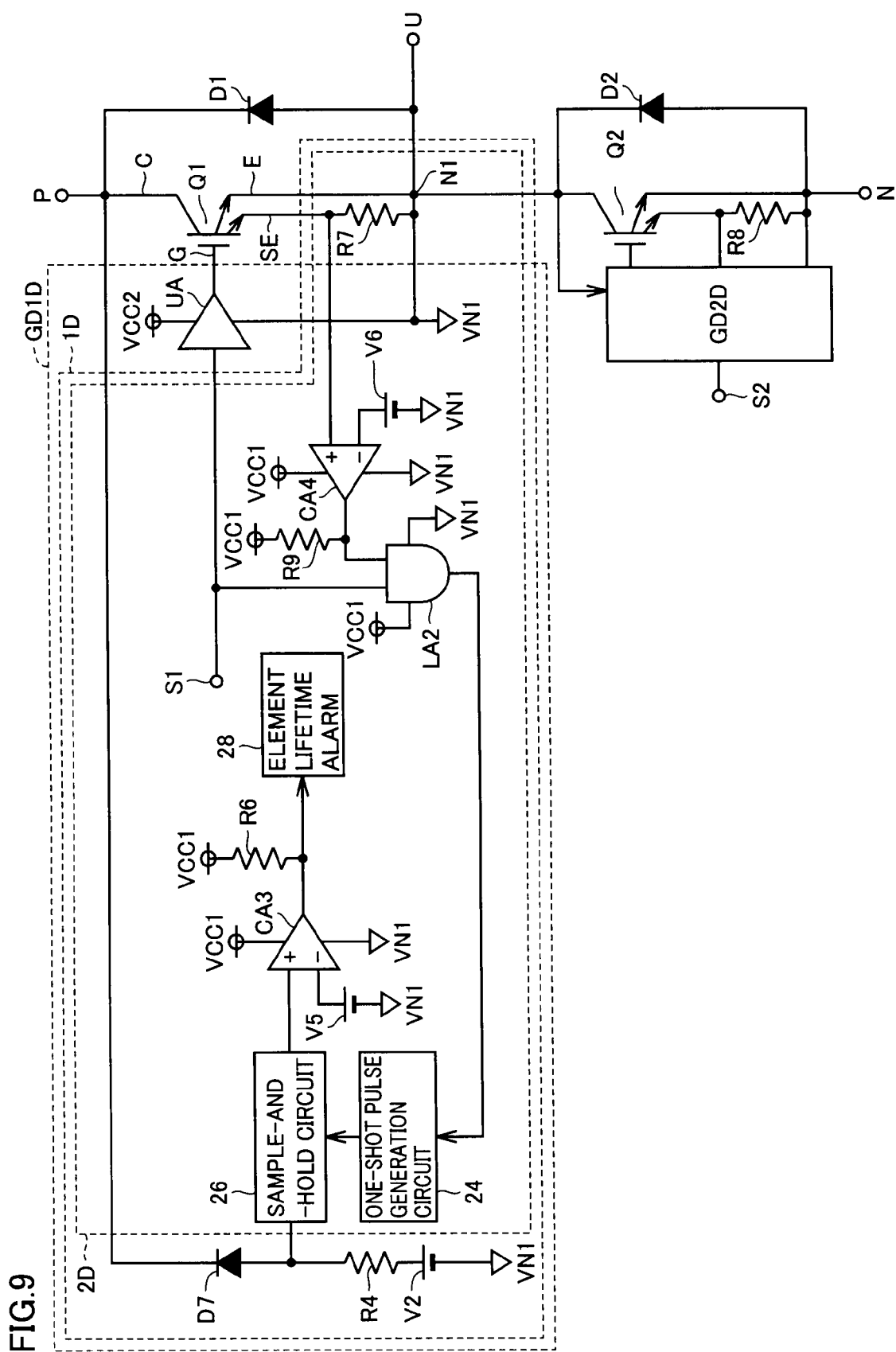
FIG. 9 is a block diagram of a configuration of a failure detection device 1D according to a fourth embodiment of the present invention.

FIG. 9 is a block diagram of the configuration of failure detection device 1D of the fourth embodiment. In the block diagram of FIG. 9, common potential VN1 qualified as the reference potential corresponds to the potential of emitter E (node N1) of IGBT Q1. A gate drive circuit and a failure detection device of the same configuration are provided for each of IGBT Q1-IGBT Q6. Therefore, a gate drive circuit GD1D and a failure detection device 1D provided for IGBT Q1 will be described representative thereof.

Referring to FIG. 9, gate drive circuit GD1D includes a drive circuit UA, and respective structural elements of failure detection device 1D other than resistance element R7. Drive circuit UA is similar to that of the first to third embodiments, operating at power supply voltage VCC2 (for example 15V).

Failure detection device 1D includes a diode D7 with high breakdown voltage, resistance element R4, DC power supply V2 and a degradation determination unit 2D. Degradation determination unit 2D includes comparators CA3 and CA4 with an open collector output, a logic circuit LA2, DC power supplies V5 and V6, a one-shot pulse generation circuit 24, a sample-and-hold circuit 26, an element lifetime alarm 28, and resistance elements R6, R7 and R9. Each of resistance elements R6 and R9 is employed as a pull-up resistor connected to the output terminals of comparators CA3 and CA4. Resistance elements R6 and R9 have one ends connected to power supply node VCC1 (for example, 5 V). Comparators CA3 and CA4 as well as logic circuit LA2 operate at power supply voltage VCC1.

In FIG. 9, the connection of diode D7, resistance element R4 and DC power supply V2 is similar to that of the first to third embodiments. Diode D7 has its cathode connected to collector C of IGBT Q1 and its anode connected to one end of resistance element R4. A voltage positive to node N1 is applied to the other end of resistance element R4 from DC power supply V2.

For the purpose of measuring the collector current, an IGBT with a current detection electrode (hereinafter, referred to as a sense IGBT) is used for IGBT Q1-IGBT Q6 employed in the fourth embodiment. The sense IGBT includes a current detection electrode (sense electrode) SE through which detected current flows according to the collector current (main current). A detection resistor is provided between sense electrode SE and emitter E. The voltage across the detection resistor is detected. In FIG. 9, resistance element R7 is provided between sense electrode SE of IGBT Q1 and node N1, and resistance element R8 is connected between sense electrode SE of IGBT Q2 and low voltage node N.

As mentioned above, failure detection device 1D of the fourth embodiment detects increase in the ON voltage of the switching element under the same applied current. Since the ON voltage of the switching element depends upon the temperature, the dependency of the ON voltage on the temperature must be taken into account to properly determine degradation.

Figure 10:
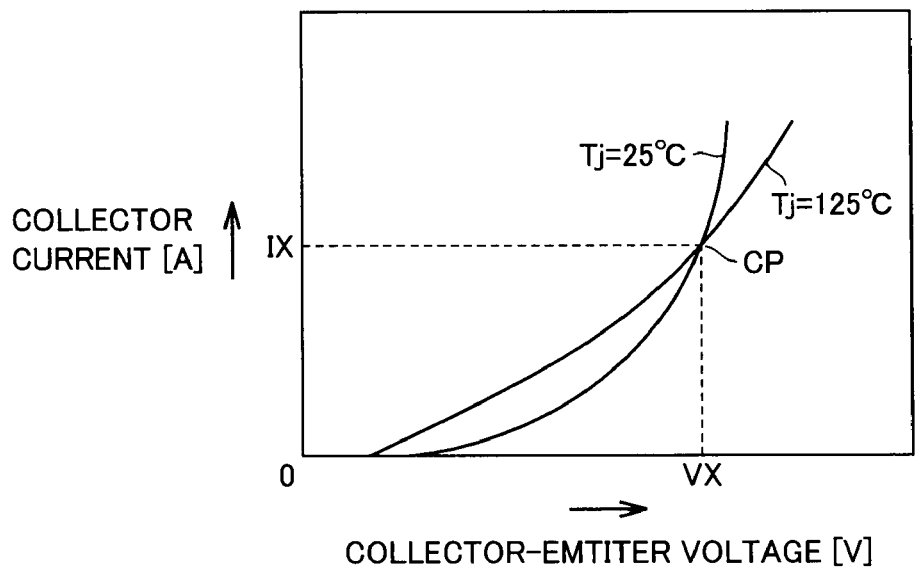
FIG. 10 is a graph representing the temperature dependency of the current and voltage characteristics of an IGBT.

FIG. 10 is a graph representing the temperature dependency of the current and voltage characteristics of an IGBT. In FIG. 10, the collector-emitter voltage is plotted along the horizontal axis, and the collector current is plotted along the vertical axis.

Referring to FIG. 10, there is a cross point CP in the current and voltage characteristic curves of the IGBT with respect to different temperatures. In the region where the current is lower than a current value IX at cross point CP, the ON voltage becomes lower as the temperature increases. In other words, the ON voltage has a negative temperature dependency. In the region where the current is higher than current value IX, the ON voltage increases as the temperature becomes higher. In other words, the ON voltage has a positive temperature dependency. At current value IX corresponding to the boundary between the two regions, there is substantially no temperature dependency of the ON voltage. Based on the current value IX at the boundary between the region where the temperature dependency of the ON voltage is negative and the region where the temperature dependency of the ON voltage is positive as the reference potential, the change in ON voltage VX over time at reference current IX is measured. Accordingly, the influence of temperature in determining the degradation of a power switching element can be minimized.

Current value IX at cross point CP that differs for each IGBT element is generally 0.8 to 1.2 times the rating of the collector current. The IGBT is used under the condition that the collector current is 1.5 times the rating at most. Therefore, the collector current will reach the level of reference current IX when a current approximating the highest value flows to the IGBT. Therefore, determination of the lifetime can be made by failure detection device 1D. In the case where the collector current does not reach the level of reference current IX, lifetime determination cannot be made by failure detection device 1D. However, the possibility of short-circuit failure in the IGBT is low since there is little heat generation at the IGBT.

Referring to FIG. 9 again, comparator CA4 is provided to detect the match of the collector current with the above-described reference current IX. The non-inverting input terminal of comparator CA4 is connected to sense electrode SE of sense IGBT Q1, and receives the voltage generated across resistance element R7. DC power supply V6 is connected to the inverting input terminal of comparator CA4. The voltage value of DC power supply V6 is set based on the level of reference current IX such that comparator CA4 outputs a signal of a high level when the collector current of sense IGBT Q1 exceeds reference current IX.

Logic circuit LA2 outputs the AND operation of the control signal of IGBT Q1 and the output signal of comparator CA4. One-shot pulse generation circuit 24 is triggered by the leading edge of the output of logic circuit LA2 to provide a one-shot pulse to sample-and-hold circuit 26.

Figure 11:
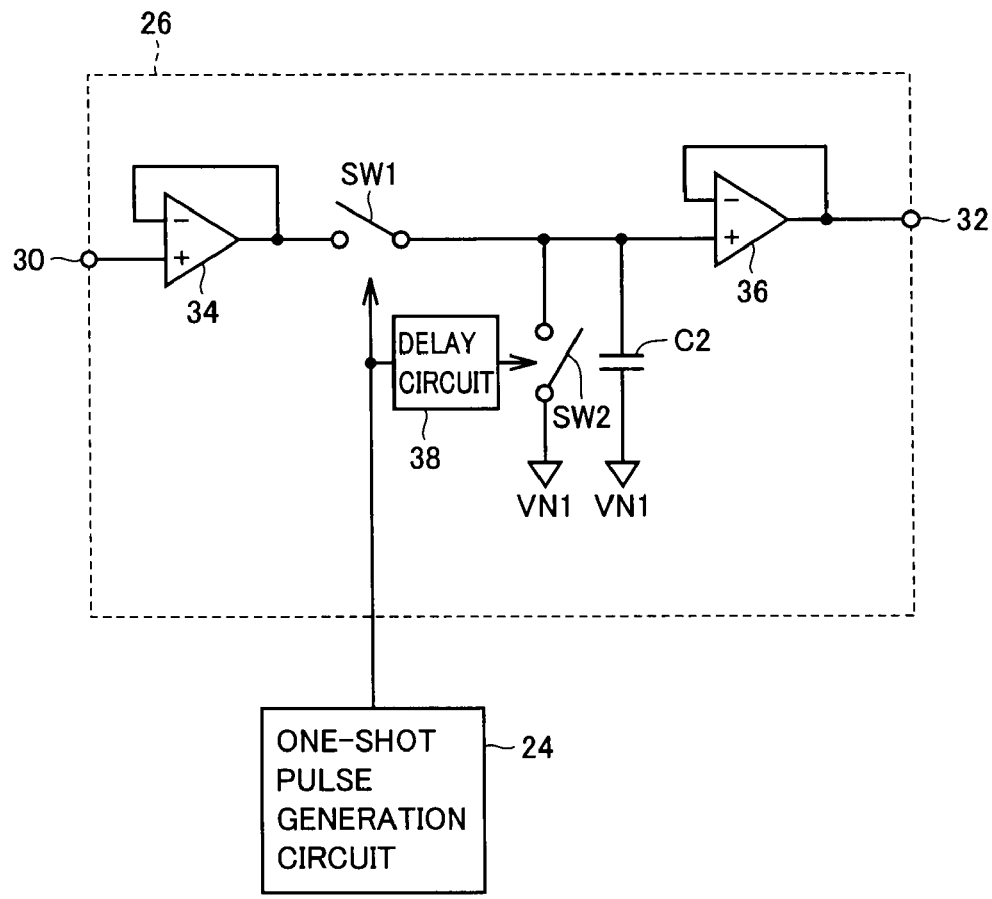
FIG. 11 is a block diagram of an example of a configuration of a sample-and-hold circuit 26 of FIG. 9.

FIG. 11 is a block diagram of an example of a configuration of sample-and-hold circuit 26 of FIG. 9.

Referring to FIG. 11, sample-and-hold circuit 26 includes operational amplifiers 34 and 36, switches SW1 and SW2, and a voltage-holding capacitor C2. Operational amplifiers 34 and 36 are employed as a voltage follower by having the input terminals and inverting input terminals directly connected. Operational amplifier 34, switch SW1, and operational amplifier 36 are connected in series in this order between an input terminal 30 and an output terminal 32 of sample-and-hold circuit 26. Capacitor C2 and switch SW2 are connected parallel to each other between the non-inverting input terminal of operational amplifier 36 and node N1.

During the output of a high level signal from one-shot pulse generation circuit 24, switch SW1 is closed, and capacitor C2 is charged with the voltage of input terminal 30. The charged voltage of capacitor C2 is output from output terminal 32. At an elapse of a predetermined time from the output of a high level signal from one-shot pulse generation circuit 24, switch SW2 connected to one-shot pulse generation circuit 24 through a delay circuit 38 is closed. As a result, the charged voltage at capacitor C2 is discharged via switch SW2.

Referring to FIG. 9 again, sample-and-hold circuit 26 of failure detection device 1D holds the anode voltage of diode D7 when one-shot pulse generation circuit 24 provides a high level output. The held anode voltage is provided to the non-inverting input terminal of comparator CA3.

DC power supply V5 is connected to the inverting input terminal of comparator CA3. Comparator CA3 outputs a high level signal when the anode voltage of diode D7 exceeds the voltage value of DC power supply V5. As a result, element lifetime alarm 28 notifies lifetime degradation of IGBT Q1.

As used herein, the voltage value of DC power supply V5 is set to approximately 1.2 times the ON voltage corresponding to reference current IX for an IGBT Q1 in a new-product state. Since the ON voltage of the switching element at the end of the lifetime becomes higher than the ON voltage corresponding to a new-product state, determination is made that the life of the switching element has come to an end.

FIG. 12 is a timing chart schematically showing an example of voltage and current waveforms of each element in FIG. 9. In FIG. 12, the gate voltage of IGBT Q1, the collector voltage of IGBT Q1, the anode voltage of diode D7, the output voltage of sample-and-hold circuit 26, the output voltage of comparator CA4, the output voltage of logic circuit LA2, the collector current of IGBT Q1, and the current of flywheel diode D1 are represented along the vertical axis. Time is plotted along the horizontal axis in FIG. 12.

At the zones of time t0-t1, t2-t3, t4-t5, t6-t7 and t8-t9 (the OFF zone) in FIG. 12, IGBT Q1 has a gate voltage of 0 V and is OFF. Since flywheel diode D1 is constantly OFF in the case of FIG. 12, the collector voltage during the OFF zone is at the high voltage of 600 V when IGBT Q1 is in a proper state. Since this high voltage is blocked by diode D7, the anode voltage of diode D7 is equal to 5 V, which is the voltage of DC power supply V2.

At the zones of time t1-t2, t3-t4, t5-t6, t7-t8 and t9-t11 (the ON zone), IGBT Q1 has a gate voltage of 15 V and is ON. During the ON zone, the anode voltage of diode D7 is equal to the sum of the ON voltage of IGBT Q1 and the forward voltage of diode D7.

At the ON zone, the collector current of IGBT Q1 gradually rises by PWM control. At time t10 during the zone of time t9-t11, the level of the collector current arrives at reference current IX. At this stage, the output of comparator CA4 and the output of logic circuit LA2 attains a high level (for example, 5 V). As a result, sample-and-hold circuit 26 maintains the anode voltage of diode D7 at time t10.

It is here assumed that the anode voltage of diode D7 corresponding to reference current IX is VD1 (for example, 1.2 to 2 V) when IGBT Q1 is a new product and VD2 that is higher than VD1 (for example, 2.8 V) when IGBT Q1 is at the end-of-life stage. When DC power supply V5 is set to a value between VD1 and VD2 (for example, 2.5 V), the output of comparator CA3 attains a high level at time t10. Thus, determination is made of degradation in the lifetime of IGBT Q1.

According to failure detection device 1D of the fourth embodiment, secular change of the ON voltage is detected based on the current value at cross point CP. Therefore, determination of lifetime degradation of the power switching element can be made based on a condition with the effect of temperature minimized. By determining expiration of the life of the switching element employed in the power module, a signal indicating exchange can be issued prior to damage of the power module at the lifetime limit. Thus, damage of the power module can be obviated.

Although the first to fourth embodiments have been described based on a failure detection device 1A of IGBT Q1 in inverter circuit 11, a similar advantage can be achieved for the failure determination devices of IGBT Q2-Q6 by employing a similar configuration, with the exception to the manner of setting the common potential. For the failure detection devices of IGBT Q3 and IGBT Q5, the potentials of nodes N2 and N3 are employed as the common potential, respectively, instead of common potential VN1 of FIG. 2. For the failure detection devices of IGBT Q2, IGBT Q4, and IGBT Q6, the potential of ground node GND is employed as the common potential, instead of common potential VN1 of FIG. 2.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A failure detection device for a power circuit including a switching element having a main current flowing from a first main electrode to a second main electrode altered according to a control signal, said failure detection device comprising:
   a first rectifying element having a cathode connected to said first main electrode,
   a first resistance element having one end connected to an anode of said first rectifying element, and having the other end to which a voltage positive to said second main electrode is applied, and
   a failure determination unit determining whether a failure determination condition to detect failure in said switching element is satisfied or not, wherein
   said failure determination condition includes a condition that a monitor voltage between the anode of said first rectifying element and said second main electrode is lower than a first reference voltage that is determined in advance,
   said first reference voltage is set to a voltage lower than a sum of a voltage across the first and second main electrodes of said switching element at an ON state and a forward voltage of said first rectifying element, and higher than the forward voltage of said first rectifying element.

2. The failure detection device according to claim 1, wherein said failure determination condition further includes a condition that said control signal turning said switching element ON is applied to said switching element.

3. The failure detection device according to claim 2, wherein said failure determination unit includes
   a first comparator comparing said monitor voltage with said first reference voltage, and
   a control computer providing said control signal to said switching element,
   said control computer receiving an output of said first comparator via a photocoupler to determine whether said failure determination condition is satisfied or not based on the output of said first comparator and said control signal.

4. The failure detection device according to claim 1, wherein
   said power circuit further includes a second rectifying element connected parallel to said switching element, and having a forward direction from said second main electrode towards said first main electrode,
   said failure determination condition further includes a condition that said monitor voltage is higher than a second reference voltage determined in advance, and
   said second reference voltage is set to a voltage higher than a value of the forward voltage of said first rectifying element minus the forward voltage of said second rectifying element, and lower than the forward voltage of said first rectifying element.

5. The failure detection device according to claim 4, wherein said failure determination unit includes
   a first comparator comparing said monitor voltage with said first reference voltage, and
   a second comparator comparing said monitor voltage with said second reference voltage.

6. The failure detection device according to claim 4, wherein said failure determination condition further includes a condition that said control signal turning said switching element ON is applied to said switching element.

7. The failure detection device according to claim 6, wherein said failure determination unit includes
   a first comparator comparing said monitor voltage with said first reference voltage,
   a second comparator comparing said monitor voltage with said second reference voltage, and
   a logic circuit determining whether said failure determination condition is satisfied or not based on outputs of said first and second comparators and said control signal.

8. A failure detection device for a power circuit including a switching element having a main current flowing from a first main electrode to a second main electrode altered according to a control signal, said failure detection device comprising:

a first rectifying element having a cathode connected to said first main electrode, a first resistance element having one end connected to an anode of said first rectifying element, and having the other end to which a voltage positive to said second main electrode is applied, and a degradation determination unit to determine degradation in said switching element, wherein said degradation determination unit detects a monitor voltage between the anode of said first rectifying element and said second main electrode to determine whether said detected monitor voltage exceeds a third reference voltage determined in advance when a level of said main current matches a predetermined reference current, said reference current is set to a level where the level of said main current corresponds to a boundary between a first region and a second region, said first region is a region where a voltage across said first and second main electrodes of said switching element has a negative temperature dependency, and said second region is a region where a voltage across said first and second main electrodes of said switching element has a positive temperature dependency.

9. The failure detection device according to claim 8, wherein said switching element includes a sense electrode for detecting said main current, said degradation determination unit including a second resistance element connected between said sense electrode and said second main electrode to measure said main current, a third comparator comparing a voltage generated across said second resistance element with a voltage corresponding to said reference current, a sample-and-hold circuit holding said monitor voltage when said main current matches said reference current, and a fourth comparator for comparing said monitor voltage held by said sample-and-hold circuit with said third reference voltage.

* * * * *